US010467241B2

(12) United States Patent
Thayer et al.

(10) Patent No.: US 10,467,241 B2
(45) Date of Patent: Nov. 5, 2019

(54) DYNAMICALLY PROVISIONING INSTANCES OF A SINGLE-TENANT APPLICATION FOR MULTI-TENANT USE

(71) Applicant: CA, Inc., Islandia, NY (US)

(72) Inventors: Nicholas D. Thayer, Islandia, NY (US); Julio Garcia, Islandia, NY (US); James Perkins, Islandia, NY (US); Mark Bell, Islandia, NY (US)

(73) Assignee: CA, INC., Islandia, NY (US)

( * ) Notice: Subject to any disclaimer, the term of this patent is extended or adjusted under 35 U.S.C. 154(b) by 285 days.

(21) Appl. No.: 15/468,648

(22) Filed: Mar. 24, 2017

(65) Prior Publication Data
US 2018/0278675 A1    Sep. 27, 2018

(51) Int. Cl.
| G06F 15/16 | (2006.01) |
|---|---|
| G06F 16/25 | (2019.01) |
| H04L 12/24 | (2006.01) |
| G06F 9/455 | (2018.01) |
| G06F 9/46 | (2006.01) |

(52) U.S. Cl.
CPC ........ *G06F 16/252* (2019.01); *G06F 9/45558* (2013.01); *G06F 9/46* (2013.01); *H04L 41/0806* (2013.01); *G06F 2009/4557* (2013.01)

(58) Field of Classification Search
CPC ..... G06F 16/252; G06F 9/445; H04L 41/0806
USPC ........................................................ 709/201
See application file for complete search history.

(56) References Cited

U.S. PATENT DOCUMENTS

| 2016/0261684 | A1* | 9/2016 | Khalaf ................ H04L 67/1002 |
|---|---|---|---|
| 2016/0380832 | A1 | 12/2016 | Purushotham et al. |
| 2017/0012893 | A1 | 1/2017 | Martin |
| 2017/0034016 | A1 | 2/2017 | Carroll et al. |
| 2017/0060605 | A1 | 3/2017 | Huang et al. |
| 2017/0060621 | A1 | 3/2017 | Whipple et al. |
| 2017/0068954 | A1 | 3/2017 | Hockey et al. |
| 2017/0075735 | A1 | 3/2017 | Pradeep et al. |
| 2017/0083541 | A1 | 3/2017 | Mann et al. |
| 2017/0085419 | A1 | 7/2017 | Zhang et al. |

OTHER PUBLICATIONS

A Multi-tenant Database Framework for Software and Cloud Computing Applications', https://opus.lib.uts.edu.au/bitstream/10453/30379/2/02whole.pdf, Jul. 14, 2014, pp. 1 to 224.

(Continued)

*Primary Examiner* — Wing F Chan
*Assistant Examiner* — Joseph R Maniwang
(74) *Attorney, Agent, or Firm* — Pillsbury Winthrop Shaw Pittman LLP

(57) ABSTRACT

Provided is a process, including: assigning different instances of a single-tenant application among a plurality of instances of the single-tenant application to different computing sessions with different client computing devices associated with different tenant user accounts; while the plurality of instances of the single-tenant application are executing, determining that a workload of the plurality of instances of the single-tenant application satisfies a first threshold condition; in response to the determination, automatically provisioning an added instance of the single-tenant application; and assigning the added instance of the single-tenant application to a session with a given client computing device.

20 Claims, 4 Drawing Sheets

(56) References Cited

OTHER PUBLICATIONS

Amazon Web Services—Building Fault-Tolerant Applications on AWS', Amazon Web Services—Building Fault-Tolerant Applications on AWS, http://d36cz9buwru1tt.cloudfront.net/AWS_Building_Fault_Tolerant_Applications.pdf, Oct. 2011, pp. 1 to 15.

CA App Experience Analytics', https://www.ca.com/us/products/caappexperienceanalytics.html, Feb. 22, 2017, pp. 1 to 15.

Elastic Compute Cloud (Amazon EC2)—Cloud Server & Hosting—AWS', https://web.archive.org/web/20170320081450/https://aws.amazon.com/ec2/, Mar. 20, 2017, pp. 1 to 5.

Gigaom | Multi-tenant or multi-instance cloud—why not both?', https://web.archive.org/web/20161208082125/https://gigaom.com/2014/01/26/multi-tenant-or-multi-instance-cloud-lets-do-both/, Dec. 8, 2016, pp. 1 to 4.

Hosting a Multi-Tenant Application on Windows Azure', https://web.archive.org/web/20141231084050/https://msdn.microsoft.com/en-us/library/hh534478.aspx, Dec. 31, 2014, pp. 1-6.

How can a standalone software be converted into saas/cloud offer?', https://www.quora.com/How-can-a-standalone-software-be-converted-into-saas-cloud-offer, May 27, 2012, pp. 1 to 3.

Index Aliases | Elasticsearch Reference [5.2] | Elastic', https://www.elastic.co/guide/en/elasticsearch/reference/current/indices-aliases.html, Feb. 22, 2017, pp. 1 to 13.

A Framework for Migrating Traditional Web Applications into Multi-Tenant SaaS', https://www.thinkmind.org/download.php?articleid=infocomp_2012_6_10_10161, INFOCOMP 2012 : The Second International Conference on Advanced Communications and Computation, Oct. 21-26, 2012, pp. 1 to 6.

Kibana: Explore, Visualize, Discover Data | Elastic', https://www.elastic.co/products/kibana, Feb. 22, 2017, pp. 1 to 8.

Proxy server', Wikipedia, https://en.wikipedia.org/wiki/Proxy_server, Feb. 21, 2017, pp. 1 to 11.

Single Tenant vs. Multi Tenant Business Software', https://axerosolutions.com/blogs/timeisenhauer/pulse/146/single-tenant-vs-multi-tenant-business-software, Feb. 5, 2016, pp. 1 to 10.

The SaaS Single-Tenancy vs. Multi-Tenancy Debate—SaaS Growth Strategies' https://web.archive.org/web/20161019214205/http://sixteenventures.com/saas-multi-tenancy, Oct. 19, 2016, pp. 1 to 5.

What is involved in converting an on premise software product suite into SaaS?' https://www.quora.com/What-is-involved-in-converting-an-on-premise-software-product-suite-into-SaaS, Jun. 10, 2016, pp. 1 to 3.

* cited by examiner

DYNAMICALLY PROVISIONING INSTANCES OF A SINGLE-TENANT APPLICATION FOR MULTI-TENANT USE

BACKGROUND

1. Field

The present disclosure relates generally to computing and, more specifically, to dynamically provisioning instances of a single-tenant application for multi-tenant use.

2. Description of the Related Art

In recent years, there has been a trend in software architecture away from single-tenant (often on-premises) applications towards hosted multi-tenant applications. Many companies have stopped running on their own computers the software upon which their business is based. Instead, it has become increasingly common to contract with a third party that provides the same functionality through software executed on computers controlled by the third party or others (e.g., in the public cloud). In many cases, that third-party offers the same software application to many other entities, in a multi-tenant architecture where the same (or partially overlapping) server-side code or hardware is used to service the different entities, but each entity's data is protected from other entities using the same application. In many cases, this arrangement is implemented in, and thus referred to as, a software as a service SaaS model.

At the same time, there is a code base of single-tenant applications, e.g., either from applications pre-dating this trend or applications that are designed for other use cases. Unfortunately, it is often difficult to re-use this single-tenant code with many modern multi-tenant (e.g., many SaaS) applications. Often, the data model of the single-tenant application does not contemplate multi-tenant use cases, and information can leak between tenant accounts. As a result, developers often engage in costly code re-writes or are deprived of the opportunity to re-use single-tenant code that implements functionality they would like to provide.

SUMMARY

The following is a non-exhaustive listing of some aspects of the present techniques. These and other aspects are described in the following disclosure.

Some aspects include a process to dynamically provision and terminate instances of a single-tenant application deployed for a multi-tenant use case based on workload, the process including: assigning, with one or more processors, different instances of a single-tenant application among a plurality of instances of the single-tenant application to different computing sessions with different client computing devices associated with different tenant user accounts, wherein: each instance of the single-tenant application is configured, either before, upon, or after launching, to access data of the single-tenant application in a database, the database stores data of multiple tenants accessed by instances of the single-tenant application, and the stored data of different tenants among the multiple tenants is associated with different tenant user accounts; while the plurality of instances of the single-tenant application are executing, determining, with one or more processors, in a first determination, that a workload of the plurality of instances of the single-tenant application satisfies a first threshold condition; in response to the first determination, automatically provisioning, with one or more processors, an added instance of the single-tenant application; assigning, with one or more processors, the added instance of the single-tenant application to a session with a given client computing device; after provisioning the added instance of the single-tenant application, determining, with one or more processors, in a second determination, that a workload of the single-tenant application satisfies a second threshold condition, the second threshold condition corresponding to a smaller workload than the first threshold condition; and in response to the second determination, automatically terminating, with one or more processors, at least one instance of the single-tenant application, wherein: each instance of the single-tenant application is accessed by a single tenant at a time, and a number of instances of the single-tenant application executing is dynamically scaled responsive to workload.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
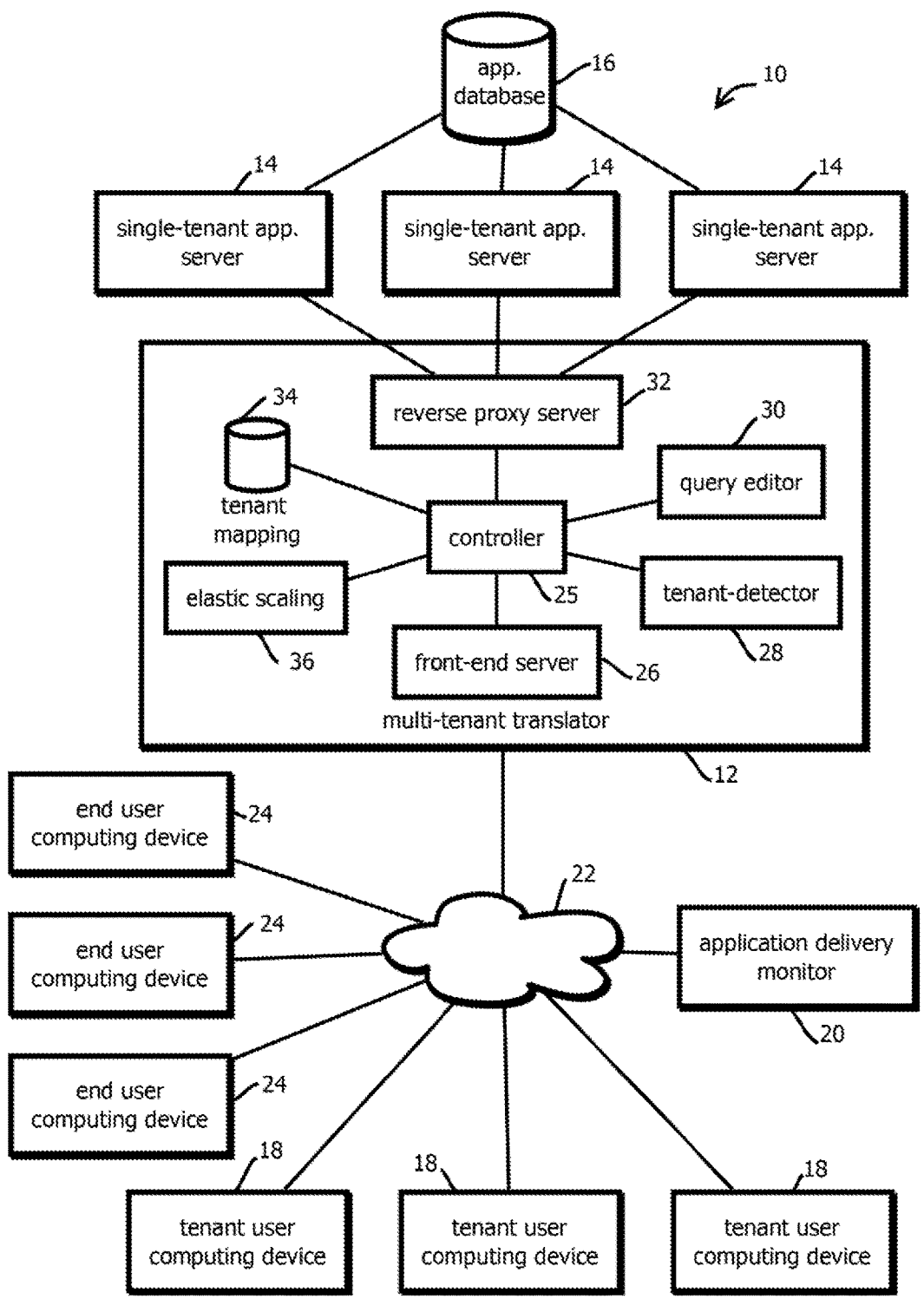
FIG. 1 shows an example of a computing environment having a multi-tenant translator in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments retrofit single-tenant applications to support multi-tenant use cases in which data access is isolated by tenant. Some embodiments augment records in the single tenant data repository with metadata that identifies a tenant. Access requests, in some embodiments, may be passed through a proxy (e.g., a reverse proxy) that augments queries to invoke a database filter that specifies the metadata for a given tenant in database accesses operations. Examples include augmenting both Elasticsearch™ (and other noSQL database queries) and structured query language (SQL) queries to add a query predicate.

Examples of this approach are described below with reference to a single-tenant data visualization application called Kibana™ used to form visualizations of data from a multi-tenant monitoring application. For instance, Kibana™ may obtain data to visualize from an Elasticsearch database. In some embodiments, this database is configured to arrange data in documents and apply an "alias" operator to the documents. In some cases, the alias operator is configured to filter the documents according to a tenant identifier, such that different tenants perceive different views of the same index of documents in the database. For example, documents (e.g., monitoring crash reports) added by tenant X have a tenant identifier of "X" are not accessible to tenant Y, and vice versa (while being in the same index of the same database).

When using an application that re-purposes a single-tenant application for a multi-tenant use case, in some embodiments, the client device may send an access request (e.g., a query) to a translator application, which may parse a tenant identifier from the access request and formulate a query with a filter that limits access to those records pertaining to the identified tenant, e.g., by adding a filter for a given alias in Elasticsearch™ or expanding on a where clause (or possibly adding a join) in a SQL database query. A similar process may be followed when a client computing device or monitoring application uploads data (e.g., a crash report) to the single-tenant application. The upload may identify a tenant, and translator application may add the corresponding metadata to the record added to the data repository. Further, in some cases, each tenant may be assigned their own instance of the single-tenant application for a given session. In some cases, the number of such instances may be scaled dynamically based on need.

In some embodiments, a single data repository serves multiple instances of the single-tenant application, and different instances of the single-tenant application are executed for each tenant. For instance, a single machine may run multiple instances of a Kibana server, each monitoring a different port, and a reverse proxy server may route augmented queries (or writes) to an Internet Protocol (IP) address and port corresponding to an identified tenant. Some embodiments may have multiple computers each running multiple instances of the single-tenant application. Thus, some embodiments of the translator application may include a translation layer and a routing layer. It should be emphasized that, while some examples are described with reference to data visualization, storage, and monitoring applications, the present techniques are applicable in a variety of other use cases where single-tenant applications are being repurposed for multi-tenant environments.

These and other techniques may be implemented in a computing environment 10 shown in FIG. 1. In some embodiments, the computing environment 10 includes a multi-tenant translator 12 operative to repurpose existing single-tenant applications for multi-tenant use cases (e.g., without changing program code of the single-tenant application or without having access to source code of the single-tenant application). In some cases, a single-tenant application may be combined with another multi-tenant application into a larger hybrid application. In the present example of a hybrid application, a single-tenant application server 14 and database 16 may be combined with a multi-tenant monitoring application having an application delivery monitor 20. In some embodiments, a plurality of tenants having tenant user computing devices 18 may monitor performance of their respective applications as those applications serve users of computing devices 24 (e.g., accessing the tenant's websites or native applications). In some cases, this monitoring and communication between the various components described may be effectuated via a network 22, such as the Internet and various local area networks.

The single tenant application, in some embodiments, may include one of the single-tenant application servers 14, the application database 16, or one of both. In some embodiments, the single-tenant application may have a data model that does not associate program state with a tenant identifier, or only associates program state with a single tenant identifier and not more than one tenant identifier. As a result, such applications are often not configured to intermingle data from multiple tenants while preventing those tenants from viewing or modifying or otherwise accessing data of the other tenants. Thus, were a traditional single-tenant application used to concurrently serve tenant A and tenant B, in many cases, tenant A could read and modify records written to the single-tenant application by tenant B, and vice versa, an arrangement which often is unacceptable for many companies and prevents such use cases.

The single-tenant application may be any of a wide variety of different applications designed for single-tenant use cases (and not designed for multi-tenant use cases). Examples include data visualization applications, logging applications, enterprise resource management applications, accounting applications, email applications, human resources management applications, inventory management applications, content management applications, and the like. In some cases, the single-tenant application may be user facing or a portion of the computing infrastructure executed in service of some other application, such as logging applications in performance management applications. In an illustrative example, the single-tenant application 14 may be a data visualization application configured to present data visualization dashboards based on data stored in the application database 16 by a monitoring application.

The application database 16 may be any of a variety of different types of databases. In some cases, each of the single-tenant application servers 14 may share the same database 16. In some embodiments, the database 16 may have a single instance of a database management system through which database access requests, like queries and write requests, are sent to effectuate those requests from each of the single-tenant application servers 14. In some embodiments, the database 16 is a relational database. Or in some embodiments, the database may be a nonrelational database, such as one that is schema free and, in some cases as a result, relatively flexible and accommodating to evolving data models. In some embodiments, the application database is a noSQL database that stores data in the form of a plurality of documents formatted in a hierarchical serialization data format, like extensible markup language (XML) or JavaScript™ object notation (JSON). In some embodiments, in these documents, database fields may be expressed as keys and database records may be expressed as values associated with those keys. In some embodiments, the documents may be structured in a hierarchical arrangement of dictionaries and lists. In some embodiments, the application database 16 is implemented on a plurality of computing devices, for instance, with each computing device hosting a different shard of the database in order to distribute a workload of the database across a plurality of computing devices and effectuate lower latency responses. (Though not all embodiments provide this benefit, which is not to suggest that other descriptions are limiting.) In some embodiments, the database application 16 includes a database management system server that sits between these computing devices hosting the different shards and the single-tenant application servers 14, and that database management system server may receive database access requests and service those database access requests by communicating with the appropriate computing device hosting the accessed data.

In some cases, the application database 16 is a multi-tenant application database, such as one configured to interface with, and hosts data for, the application delivery monitor 20, which may also be a multi-tenant application. Thus, a single application database 16 may be provided to simplify architecture of the application delivery monitor 20.

In some cases, the database 16 is a distributed, multi-tenant full-text search engine and repository for documents storing database data that is indexed by the search engine. In some cases, scaling the data across multiple computing devices and indexing may provide for relatively low latency query responses for relatively large collections of data, while storing the data in JSON on documents may provide for relatively flexible modification of the fields of information stored in the database responsive to changes in the requirements of the supported applications. In some cases, data is replicated on multiple computing devices to facilitate redundancy to failure of anyone device. (Though not all embodiments provide these benefits, which is not to suggest that other descriptions are limiting.)

The tenant user computing devices 18 may be client computing devices executed by developers or operations engineers of various tenants that have SaaS subscriptions to access and use the application delivery monitor 20 or some other multi-tenant application. In some cases, each of the tenant user computing devices is associated with a user account, such as one stored in a data repository of the application delivery monitor 20, with different tenants being associated with different user accounts. In some embodiments, an individual tenant user account may be associated with multiple user accounts corresponding to different users within an organization. In some cases, the tenant user computing devices 18 are computers like those described below with reference to FIG. 4, executing a web browser through which the tenant user computing device operates as a client device to access resources via the application delivery monitor 20 and in some cases via the multi-tenant translator 12.

For example, in some cases, the tenant user computing devices 18 may request a dashboard or other data visualization depicting performance metrics gathered by the application delivery monitor 20 and stored in the application database 16. Those dashboards or other data visualizations may be prepared by the single-tenant application server 14, through a translation process described in greater detail below with reference to FIG. 2. In some cases, each tenant may have one or more applications monitored by the application delivery monitor 20. For example, each tenant may host or otherwise control a plurality of computing devices (not shown) that include a server through which end user computing devices 24 access various resources, for instance, accessing a website offered by a respective tenant, accessing an application program interface exposed by respective tenant, or the like, in some cases via a web browser or native application executing on the end user computing devices 24. In this example, three tenant user computing devices 18 are shown to represent three different tenants, though embodiments are consistent with an expected to often include substantially more tenant user computing devices associated with substantially more tenants. Commercial use cases are expected to include 100 or 1000 different tenants accessing the application through more than 500 or more than 5000 different computing devices to monitor the performance of more than 500 or more than 5000 different applications offered by those tenants, in some cases, monitoring applications distributed across a continent or worldwide to millions of users or more.

Performance of tenant applications may be monitored with a variety of different types of application monitors. In some examples, the application monitor may be an application delivery monitor, like that shown. The application delivery monitor may be configured to monitor performance of delivery of applications, like latency associated with various transactions and crashes. Some embodiments may measure an amount of time between when an end user computing device 24 request a resource or other functionality of a tenant application and when a response is provided.

Some embodiments may measure amounts (e.g., number or frequency) of successful transactions or amounts of failed transactions, such as instances in which a webpage is not delivered, instances in which a portion of a webpage is not delivered, instances in which a native application or browser-executable script throws an error, instances in which responses timeout in virtue of exceeding a threshold duration of time for response, and the like. Some embodiments may also measure successful transactions and calculate various statistics, such as frequencies and ratios over trailing durations of time. In some cases, monitoring applications may include agents, such as an agent executing on tenant servers or other back-end tenant computing devices by which the tenant applications are provided, and those agents may report back metrics and events to the application delivery monitor 20. In some cases, agents may be included within native applications provided by tenants and installed on end user computing devices 24, and those agents may report back metrics and events to the application delivery monitor 20 indicative of performance of the tenant application on the end user computing device 24 (e.g., render times, dropped frames, and network-access latency). In some cases, some tenant events and metrics may be gathered through agentless techniques, for example, by instrumenting webpage and native application content sent to end user computing devices 24, for instance, by inserting JavaScript™ routines that monitor and report metrics and events to the application delivery monitor 20 upon execution by the end user computing devices 24 in the course of rendering the tenants' content.

A variety of other types of monitoring applications may be executed in other scenarios, for instance, in the course of monitoring performance of tenant computing devices by which services are provided to the end user computing device 24. Examples include the following:

CA Unified Infrastructure Management (UIM)™ available from CA, Inc. of Islandia, N.Y. may be used to monitor and manage data center deployments and, in particular, those in a multi-tenancy use case, like in the enterprise cloud (e.g., Amazon Web Services™ or Azure™) Some implementations automatically discover computing devices, gather metrics (like CPU usage, memory usage, network activity, etc.) and alarms about the devices, and some implementations aggregate the data in various dashboards and reports. In some cases, this data is gathered and reported to a central server by an agent installed on monitored devices. An administrator console may be used to manually configure and deploy the monitoring agents, also called robots, which may be configured to have "probes," or collections of code configured to monitor a particular type of software. Such probes may be characterized as agents in and of themselves more generally.

CA Application Performance Management (APM)™ available from CA, Inc. of Islandia, N.Y. may be used to monitor the performance of applications by providing fine-grained response times (and other metrics) attributable to portions of a call graph of the application (e.g., indicating which method, of the application called is servicing a request or is running particularly slow). In some cases, this is done by instrumenting the monitored code. An agent may execute on the computing device to receive signals from instrumented code or otherwise monitor the code through operating system interfaces. Embodiments may aggregate such data and present transaction traces that indicate the amounts of time consumed in servicing a user request attributable to various methods and services called when preparing the response to the request.

CA Application Delivery Analysis™ (ADA) available from CA, Inc. of Islandia, N.Y. may also be used to monitor the performance of software, e.g., providing relatively fine-grained measures response time viewed through the lens of network infrastructure. A developer or engineer may use CA ADA to determine that one of 50 servers in distributed system is responsible for a slowdown in a particular application feature for a subset of users. ADA may operate on layer-four of the Open Systems Interconnection (OSI) model, often the transport layer, such as on transport control protocol (TCP) metadata, like packet headers. By monitoring network exchanges, ADA may infer the as-built topology of a distributed application (e.g., what hosts are in a topology (and how they connect in the topology) and where there is redundancy in the topology). Often these topologies have one or more entry hosts (e.g., a web or API server) and a set of downstream hosts that perform back-end processes (e.g., controllers, databases, load balancers, servers that interface with third party API's, etc.).

The end user computing devices 24 may be any of a variety of different types of computing devices by which users access applications provided by the various tenants, in some embodiments. Examples include the computing devices described below with reference to FIG. 4 and may include mobile computing devices, desktop computing devices, set-top box computing devices, Internet-of-things appliances, in-dash automotive computers, kiosks, laptops, tablets, wearable computing devices, industrial equipment, and the like.

In some embodiments, the multi-tenant translator 12 includes a controller 25, a front-end server 26, a tenant detector 28, a query editor 30, a reverse proxy server 32, a tenant mapping repository 34, and an elastic scaling module 36. In some embodiments, the controller 25 may execute processes shown in FIGS. 2 and 3 and coordinate the operation of the other components 26-34.

In some embodiments, the front-end server 26 may receive commands, such as a request to access functionality of the single-tenant application. In some cases, the request may be sent by the application delivery monitor 20, for example, responsive to a corresponding request from a tenant user computing device, or in some cases, the request may be sent directly from the tenant user computing device 18 to the multi-tenant translator 12. In some cases, the request may be an application program interface request, such as a representational state transfer (REST) application program interface request for a graphical representation of data stored in the application database 16. In some cases, parameters of the requested visualization may be encoded in the request, for example, within a path of a uniform resource locator (URL) in an application layer request to the multi-tenant translator or within a query string of such a URL. In some embodiments, the request may include an identifier of the tenant user account, for instance, within the query string.

In some cases, the request may be conveyed in multiple exchanges between the multi-tenant translator 12 and one of the other computing devices, like devices 18 or 20. For example, a portion of the request may be sent to the multi-tenant translator 12, and the multi-tenant translator 12 may respond with instructions to the requesting device to retrieve a tenant identifier from memory, for example, in a localStorage object or a cookie accessible to a browser. That identifier may then be sent back to the multi-tenant translator 12 in a second exchange, which is still considered part of the same command.

In some embodiments, the front-end server 26 monitors a port at an IP address associated with a URL of the multi-tenant translator by a domain name service (such as one specific to the application monitor 20). In some embodiments, the multi-tenant translator 12 is a nonblocking server operative to concurrently service a relatively large number of requests from different tenant user computing devices 18. The received requests may be parsed by the front-end server 26 and sent to the controller 25 to effectuate the requested operations.

In some embodiments, the controller 25 may instruct the tenant detector 28 to identify the tenant and retrieve related data from the tenant mapping repository 32. In some embodiments, the tenant detector 28 may retrieve (e.g., parse) the tenant identifier from the request and query the tenant mapping repository 32 for data related to that tenant that distinguishes that tenant from other tenants in the multi-tenant translator 12. In some cases, each tenant may be associated with a different one of the single-tenant application servers 14, and the tenant mapping 32 may identify a network socket monitored by the respective single-tenant application server 14, as described in greater detail below with respect to the reverse proxy server 32. Further, the tenant mapping repository 32 may include records that uniquely associate each tenant identifier with a value of a field in the application database 16 that distinguishes records of the respective tenant from records of other tenants.

In some embodiments, the query editor 30 may be operative to modify access requests to the application database 16 in order to convert an access request designed for a single-tenant use case into an access request suitable for a multi-tenant use case. In some embodiments, the query editor 30 may modify requests sent to the single-tenant application servers 14, or the query editor 30 may interface between the single-tenant application servers 14 and the application database 16, modifying access requests sent from the single-tenant application servers 14 to the application database 16 (and presenting an environment that appears to each single-tenant application instance that the single-tenant application instance is in a single tenant environment, but with a different tenant in each case). For example, in some embodiments, the query editor 30 may receive an application program interface request sent by a tenant user computing device or the application delivery monitor 20 to the multi-tenant translator 12 and modify that request to include information by which access requests to the application database 16 may be constructed to isolate information pertaining to a single tenant associated with the request. Examples include appending key-value pairs to query strings of URLs of RESTful API requests, such as appending a key-value pair indicating a tenant field paired with the tenant ID (e.g., "&tenantID=1234").

In other cases, the query editor 30 may modify queries output by single-tenant application servers 14 to the application database 16, for instance, by intercepting SQL queries or queries in other query languages and modifying the queries to include a query predicate, such as criteria for a filter that specifies that the query pertains only to records associated with a specified tenant identifier, such as one retrieved by the tenant detector 28 from the tenant mapping repository 32 or the incoming command. For example, in a SQL query, some embodiments may modify a where clause of the SQL query to reference a tenant identifier field followed by an equals operator, that is then followed by a tenant identifier.

In some embodiments, as noted above, the application database 16 may be a document database. Some embodiments may modify right and read requests to this database based on tenant identifiers. For example, some embodiments may insert an alias for each of several indexes or a single index of the document database, and the document database may associate that alias with documents in the respective indices. In some cases, the aliases may be added by the application delivery monitor 20 upon writing records to the application database, and the query editor 30 may insert corresponding aliases as the single-tenant application servers read or write to the application database.

In some cases, the aliases may be associated with filters by which different collections of a given index may be selected. In some cases, documents or entries within the documents (e.g. a dictionary or list or item therein) may be associated with a field having a value that serves as a unique tenant identifier among the plurality of tenants, and some embodiments may include a reference to a filtered alias as a query predicate to select for records having the identified value and limit the application of queries to those records. For example, some embodiments may add an alias with a filter having a term, or criteria, that specifies a tenant identifier equals a particular value associated with the tenant to create a filter for that tenant. In some cases, the single-tenant application servers 14 may be configured to access single-tenant data repositories in which such filters or aliases are not used or not used in this manner, and some embodiments may augment database access requests from the single-tenant application servers 14 to further specify which data is accessed with an alias, and alias filter, or other query predicate. Thus, each single-tenant application server 14 may perceive a different subset of the application database 16 without the single-tenant application itself being modified to accommodate a multi-tenant data model, in some embodiments.

In some embodiments, data may be grouped to effectuate faster database access request responses based on these types of query predicates. For example, some embodiments may associate routing values that direct operations to particular shards based on these query predicates, for instance, after distributing values across shards that tend to be accessed concurrently, or concentrating values within a shard the tend to be accessed sequentially.

In some embodiments, the single-tenant application servers 14 may each be an instance of a single tenant application, such as an identical instance of the single-tenant application executed in a different process. In some embodiments, each of the single-tenant application servers 14 may be executed on the same computing device, and each single-tenant application server 14 may be configured to monitor a different port of an IP address of that computing device. In some embodiments, the tenant mapping repository 32 may associate these port numbers with different tenant user accounts, thereby providing a persistent instance of a single-tenant application server for each tenant user account.

In some cases, however, tenants may tend to not access resources very frequently, and a smaller set of single-tenant application servers may be deployed to service a larger set of tenants, for instance, with one single-tenant application server 14 being maintained for every 10 tenants or every five tenants. In some cases, the number of single-tenant application servers 14 may be dynamically scale by the elastic scaling module 36 based on a workload of the multi-tenant translator 12, for instance, by adding additional instances of single-tenant application servers 14 when more than a threshold amount, such as all, or all but one, two, or three instances are currently being accessed in an ongoing session (or were accessed within a threshold trailing duration of time) with a tenant user computing device 18.

Some embodiments of the elastic scaling module 36 may automatically terminate instances upon more than a threshold amount of the instances, such as more than two, more than three, or more than five, instances of the single-tenant application servers 14 not being used by an ongoing session with the tenant user computing device 18 (or not being accessed within a threshold trailing duration of time).

In some embodiments, a network socket by which a single-tenant application server 14 is currently (for instance in an ongoing session) or persistently accessed by a given tenant user account may be associated with that tenant user account in the tenant mapping repository 32. In cases in which single-tenant application servers 14 are dynamically assigned to tenant user accounts, for instance, upon a tenant user computing device 18 initiating a new session, like in cases in which the number of single-tenant application servers 14 are dynamically scaled, embodiments may update mappings in the tenant mapping repository 32 to designate mappings to network sockets at the time such an assignment takes place. In some cases, the network sockets may be defined by a unique combination of a network address (like an IP address) and a network port (also referred to more concisely herein is simply a "port"). In some cases, a network stack of each computing device may be configured to multiplex or demultiplex packets sent or received over a network according to a port number associated with each of those packets ranging, for instance from 0 to 65,535 (corresponding to a 16-bit integer), and port numbers may be, for instance, uniquely, associated with an application executing on that computing device configured to monitor messages sent to that port number or send messages with that port number.

In some cases, each of the single-tenant application servers 14, or a subset thereof, may execute on different network hosts having different IP addresses. In some embodiments, those different IP addresses may be associated with tenant user accounts, either according to an ongoing session or persistently, in the tenant mapping repository 32. In some cases, those different hosts may be on the same computing device, for instance, in different virtual machines, or those different hosts may be on different computing devices.

In some embodiments, the reverse proxy server 32 may be configured to receive a message to a given IP address and port number, such as a packet, like a transport control protocol packet encapsulated in an Internet Protocol packet, for each of the single-tenant application servers 14. For instance, each of the tenant user computing devices 18 may communicate with a different single-tenant application server 14 by sending messages to the same IP address and port number of the multi-tenant translator 12, and the reverse proxy server 32 may cause corresponding messages to be sent to the different respective single-tenant application servers 14 associated with the respective tenant user computing devices' tenant user accounts. Thus, each tenant user computing device 18 may communicate with a different single-tenant application server 14 even though each tenant user computing device 18 sends and receives messages from the same IP address and port number. In some embodiments, the reverse proxy server 32 may be configured to receive a tenant identifier and retrieve the corresponding network socket from the tenant mapping repository 32 assigned to the corresponding single-tenant application server 14.

This process may be reversed in the other direction. For example, the reverse proxy server 32 may receive a message from a single-tenant application server 14, and determine which tenant user computing device 18 (and its IP address and port number used in communications an ongoing session) is in a session with that single-tenant application server 14, in some cases based on a mapping between a device 18 and a session identifier in the packet or by decapsulating a protocol wrapper. Some embodiments may then route that message to the appropriate tenant user computing device 18 based on the determination.

The reverse proxy server 32 may be configured to modify messages between single-tenant application servers 14 and tenant user computing devices 18 with a variety of different techniques. In some cases, the modification may include decapsulating incoming messages (e.g., removing headers, verifying checksums, and retrieving payloads) and aggregating payloads from a plurality of packets conveying messages that cross packets to reformulate an entire message, before segmenting that message and re-encapsulating the message, in some cases in multiple packets with different headers according to the process above, for instance with a different recipient IP address, port number, or both relative to the recipient IP address or port number in a header of a received packet.

In some cases, modification may be performed without bringing a message up through an entire network stack of the reverse proxy server 32, for instance, by operating upon the received packets without decapsulating or aggregating. Some embodiments may modify sender or recipient address fields or port fields in headers of packets, replacing existing sender or recipient IP address or port number with a sender or recipient IP address report number retrieved based on the tenant mapping repository records 32 corresponding to a tenant identifier associated with the packet.

In some cases, modification may include creating a new packet with a new header that encapsulates a received packet. For instance, some embodiments may receive a packet conveying some or all of a message from a tenant user computing device and insert that entire packet, including its header, into the payload of a newly created packet, for instance, in a transport control protocol (TCP) wrapper packet. This TCP wrapper packet may then be sent by the reverse proxy server 32 with a recipient network socket identified in the recipient header of the TCP wrapper packet to the appropriate single-tenant application server 14. The operating systems of the single-tenant application servers 14 may be configured to decapsulate the TCP wrapper packet, and then decapsulate at the payload from the TCP packet inside the payload of the TCP wrapper packet to access the message. In cases in which a new transport layer protocol (e.g., TCP) or network layer (e.g., Internet protocol) header is created in a new wrapper, this is still be referred to herein as modifying a header, along with cases in which an existing header is changed, for instance, by changing a recipient or sender network socket.

In some cases, the reverse proxy server 32 may operate upon messages sent by the application delivery monitor 20 and my may apply the same or similar modifications based on a tenant identifier included with messages sent by the application delivery monitor 20.

Thus, a single network socket of the multi-tenant translator 12 may be routed to the appropriate one of a plurality of instances of the single-tenant application server 14, and exchanges between that single-tenant application server 14 and a shared application database 16 may be modified in a way that presents different views of the data in the application database 16 to the different single-tenant application servers 14 according to tenant identifier. As a result of one or both of these techniques, some embodiments may retrofit a single-tenant application for multi-tenant use cases. (Though it should be emphasized that not all embodiments afford these benefits, as multiple independently useful techniques are described, e.g., embodiments may use the process of FIG. 3 without also using the process of FIG. 2, which is not to imply that any other description is limiting.)

Figure 2:
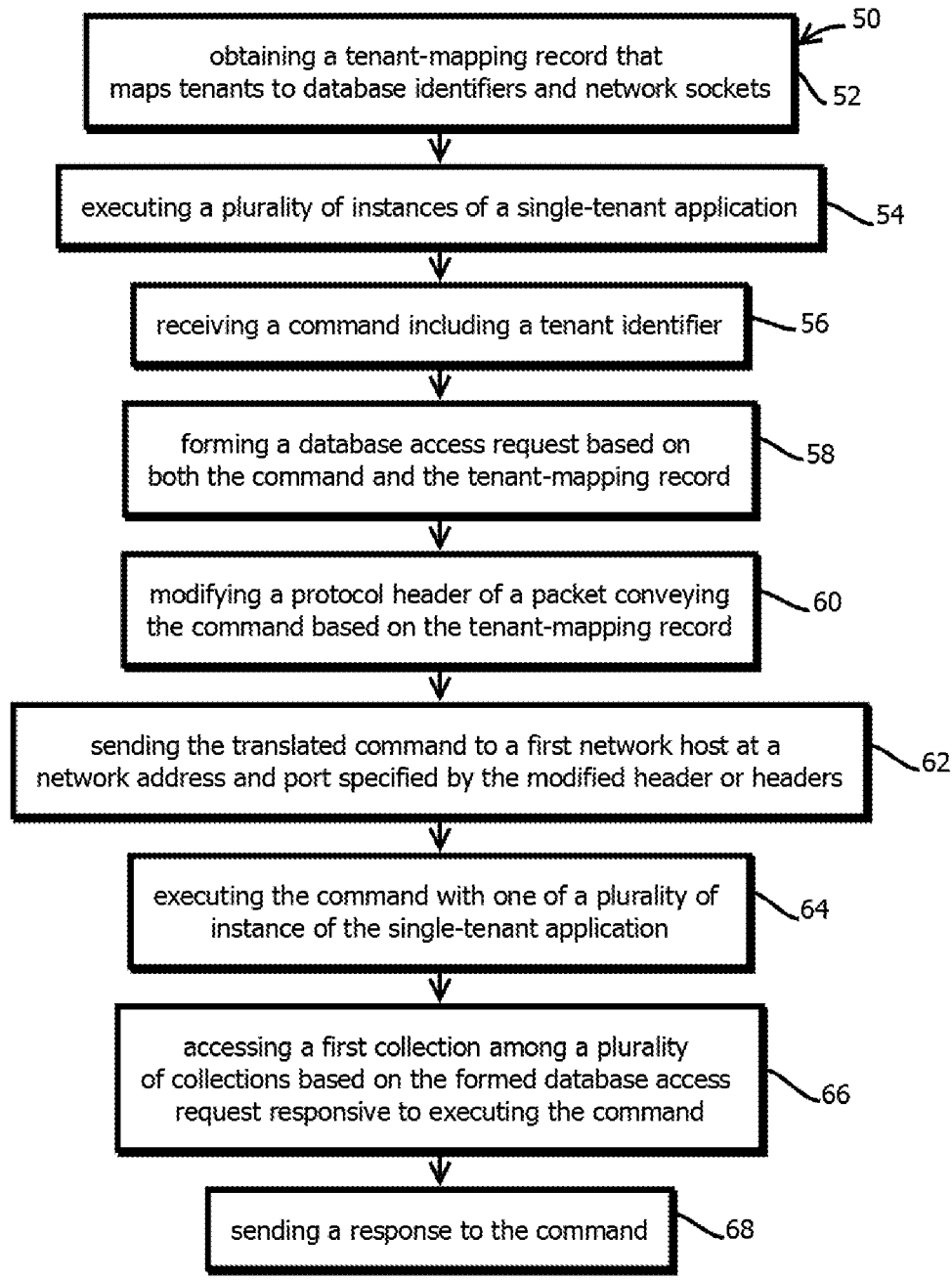
FIG. 2 shows an example of a process to configure a single-tenant application for multi-tenant use cases in accordance with some embodiments.

In some embodiments, the above techniques may be implemented by executing a process 50 shown in FIG. 2. In some embodiments, this process 50 may be executed by the multi-tenant translator 12, though embodiments are not limited to that implementation, which is not to imply that any other feature is limited to the described example. In some embodiments, multiple instances of the process 50 or subsets thereof may be executed concurrently, for instance, in service of several ongoing concurrent sessions. In some cases, steps of the process 50 may be repeated, omitted, or executed in a different order, which is not to suggest that other embodiments are not also amenable to variation relative to the described example.

In some embodiments, the process 50 includes obtaining a tenant-mapping record that maps tenants to identifiers of those tenants and network sockets, as indicated by block 52. Some embodiments include executing a plurality of instances of a single tenant application, as indicated by block 54. Some embodiments include receiving a command including a tenant identifier, as indicated by block 56, and forming a database access request based on both the command and the tenant-mapping record, as indicated by block 58. The tenant-mapping record may be identified based on the tenant identifier received in operation 56.

Some embodiments include modifying a protocol header of a packet conveying the command based on the tenant-mapping record, as indicated by block 60. In some cases, the protocol header may be a transport layer protocol header, like a transport control protocol header or a network layer protocol header, like an IP header (or both). Modification may include wrapping an existing packet, creating a new packet, and changing header information of a received packet. Some embodiments include sending the translated command to a first network host at a network address and port specified by the modified header or headers, as indicated by block 62. Some embodiments include executing the command with one of a plurality of instances of the single tenant application, as indicated by block 64.

Some embodiments include accessing a first collection among a plurality of collections of tenant data based on the formed database access request responsive to executing the command, as indicated by block 66. For example, the command may be received by one of the above-described single-tenant application servers 14, and in the course of executing that command, that single-tenant application server 14 may send a database access request to the application database 16. Some embodiments may then send a response to the command, as indicated by block 68, for example, back to one of the above-described tenant user computing devices 18 that issued the command initially (e.g., a request to view a dashboard or report for the monitoring application). In some cases, the response may be instructions that cause the tenant user computing device 18 to present a graphical representation of data gathered by the application delivery monitor 20 and stored in the application database 16, e.g., data describing performance of an application provided by that tenant.

As noted above, single-tenant applications may be repurposed for use with modern multi-tenant (e.g., many SaaS) applications. A single instance of a single-tenant application is often only able to service a single session for a single tenant. Often the data model of the application does not contemplate other tenants or sessions. Executing a single instance for every tenant, however, is often costly, as many tenants do not use the application most of the time, and executing the instances can consume costly computing resources (e.g., CPU cycles, memory, network bandwidth, and related electricity and thermal budgets).

Some embodiments dynamically create and terminate instances of a single-tenant application as needed, e.g., to respond to client requests, or when a threshold amount of unused buffer instances grows too large or too small. In some embodiments, a client computing device submits a request for resources provided by the single-tenant application, and the request may include an identifier of the tenant associated with the client computing device (among a plurality of tenants supported by the system, and possibly with multiple clients per tenant). In some embodiments, a translator application or other server system receives the request, parses the tenant ID, and determines whether an unused existing instance is spun up. If so, the request is routed to that instance. If not, some embodiments spin up a new instance of the single tenant application to be dedicated to the given tenant. Some embodiments periodically determine whether existing instances have been accessed within a threshold duration of time and terminate the instance if not (e.g., after 20 minutes of non-use). In some cases, multiple instances are executed on a single computer, and each tenant is assigned a different port, which is tracked by a reverse proxy server for routing messages from a plurality of tenant user computing devices 18 to a plurality of single-tenant application servers 14 through a single IP address and port of the reverse proxy server.

That said, embodiments are not limited to systems implementing this technique, as there are multiple independently useful techniques described herein, and some embodiments may implement other techniques (e.g., those of FIG. 2) without dynamically scaling instances of the single-tenant application, which is not to suggest that any other feature described herein limited described embodiments. Further, it should be emphasized that the technique of FIG. 3 may be implemented independently of the techniques described above, for example, some embodiments may dynamically elastically scale a number of instances of a single-tenant application without implementing the above-described reverse proxy server, query editor, or both. Or some embodiments may combine part or all of these approaches.

In some embodiments, the elastic scaling module 36 described above may execute a process 80 shown in FIG. 3. In some embodiments, the process 80 may be executed as a service (for example, comprising several processes executing in an operating system), or in some cases, the illustrated process 80 may be executed by one or more processes running an operating system that does not designate the processes as a "service." In some embodiments, the process 80, whether instantiated as a computer processor or a service, may execute in the background of an operating system in which some or all of the above-described instances of the single-tenant application server 14 also execute. In some cases, each of the single-tenant application instances and the process 80 may execute in a single user-space instance provided by the operating system, for example, with a shared memory address space and filesystem.

In some embodiments, the process 80 may run continuously while instances of the single-tenant application are added and removed. Or in some cases, some or all of the process 80 may be run periodically, for example, as a chron job.

In some embodiments, the process 80 begins with receiving a request to initiate a new session, as indicated by block 82. In some embodiments, the request may be received from one of the above-described tenant user computing devices or from the application delivery monitor 20, for example, in cases in which the application delivery monitor 20 passes a request from computing device 18 through to the single-tenant application or formulates a request for the single-tenant application to service the request from the tenant user computing devices 18 to the application delivery monitor 20. In some embodiments, the request initiating a new session may include login credentials associated with (e.g., uniquely) a tenant user account, and some embodiments may include determining whether the requesting computing device is authorized to access data of the tenant user account based whether on the supplied credentials match credential stored in memory in association with the tenant user account. In some embodiments, the request may be received through multiple exchanges between the multi-tenant translator 12 and the requesting computing device, for example, with an initial portion of the request being supplied in a request for a log-in interface, and another portion being supplied in resulting credentials supplied via that interface.

In some embodiments, each tenant user account using the single-tenant application may be assigned its own instance to avoid mixing data between tenants in program state. In some embodiments, a single tenant's user account may have multiple users, such as multiple developers or operations engineers employed by the tenant. In some embodiments, each of those users under the same tenant user account may share an instance of the single-tenant application concurrently. Or in some embodiments, each user of the single tenant may have their own instance of the single-tenant application. Thus, in some cases, multiple instances of the single-tenant application may concurrently be assigned to the same tenant user account. In some cases, embodiments may support more tenant user accounts than there are instances of the single-tenant application executing during at least some periods of time.

Some embodiments may include determining whether a workload of the single-tenant application is greater than a threshold, as indicated by block 84. Workload may be quantified with various workload metrics indicative of an amount of unused instances of the single-tenant application. In some embodiments, the workload may be an aggregate workload across all instances of the single-tenant application, for example, a total number of ongoing sessions or requested sessions combined with ongoing sessions, with the single-tenant application, subtracted from a number of instances executing. In some embodiments, a measure of a workload may be based on a value indicating that there are ten requested sessions or ongoing sessions combined, for instance, with nine ongoing sessions and one requested additional session, and another value indicating that there are 12 instances executing, with the workload metric indicating a buffer of two instances read to accommodate additional requests.

In some embodiments, the workload metric may be other values comparing an amount of demand to an amount of available capacity. For example, the workload metric may be an amount of ongoing, predicted (e.g., based on historical usage patterns), or requested sessions (for example combined) relative to an amount of available instances of the single-tenant application. For example, in some cases, there may be 25 instances of the single-tenant application executing, and there may be 23 ongoing sessions with one request for a new session received the block 82. In some embodiments, the measure of the workload may be a difference between these values, for example, a calculated workload metric indicating that there is only two remaining unused instances of the single-tenant application or that after one instance is used for the requested new session, there will only be one remaining unused instance of the single-tenant application. In some embodiments, the workload metric is a percentage of used instances or number of used instances of the single-tenant application currently being executed.

In some cases, the workload metric is based on predicted demand. In some embodiments, demand may be predicted based on time of day, day of week, month of the year, or other signals. In some cases, demand may be predicted based on monitoring data indicating worse than a threshold level of performance across tenant applications, or monitoring data indicating more than a threshold amount of alarms across the tenant applications being monitored.

In some embodiments, the determination of block 84 may include querying the various instances of the single-tenant application (or data emitted therefrom) to infer whether each instance has an ongoing session. Some embodiments may maintain a mapping in memory of ongoing sessions to the instances, indicating which instance is assigned to which session, and some embodiments may associate with each of these mappings a flag (e.g., binary value) indicating whether there is data indicating the session is ongoing. As noted below, in some cases, log files written by the various instances of the single-tenant application may be periodically interrogated to ascertain whether entries in the log file indicate ongoing use, for example, a log-file entry indicating an interaction with the single-tenant application occurring within less than a threshold trailing duration of time, as indicated by a timestamp associated with an entry in the log file describing the interaction.

In some embodiments, as noted below, each of the instances of the single-tenant application may be executed by launching an executable in a different subdirectory of the shared filesystem, and each subdirectory may include a respective log file that may be interrogated, along with a copy of set of resources for the respective instance. Some embodiments may maintain a data structure that maps each of the instances to the corresponding directory, such that the log files may be identified for purposes of determining which instances are in use.

In some embodiments, different instances may execute in different user-space instances (e.g., containers), in different virtual machines, or in different computing devices. Some embodiments may include agents executing in or alongside these environments and configured to monitor use of the single-tenant application instances, e.g., interrogating local log files, or monitoring usage with the other techniques herein. In some cases, these agents may including one or more of the types of agents described above. In some cases, the agents may report back use-state of instances (i.e., whether a given instances is currently being used by a tenant in a session).

In some cases, the use-state of an instance may be inferred based on network traffic. For instance, some embodiments may query a log file of the reverse proxy server (or configure the reverse proxy server to maintain and provide access to a record indicating the last time each instance was accessed). Or some embodiments may snoop network traffic to make such inferences. Some embodiments may instrument the single-tenant application and infer usage based on monitoring data (e.g., an inventory of time-stamped function calls, or documented transactions) emitted by instrumented code.

In some embodiments, the threshold is a number of unused instances of the single-tenant application, for example, a threshold indicating that there should be at least one, at least five, or at least 20 instances of the single-tenant application ready for use. Having an excess instance on hand may facilitate lower-latency responses to requests by avoiding delays associated with launching a new instance, or some embodiments may only launch instances as needed. In some embodiments, the determination of block 84 is a determination of whether the workload metric satisfies a threshold condition, such as a threshold condition that the workload metric is greater than a threshold value, greater than or equal to a threshold value, or (e.g., in cases where the workload metric value is inverted), the determination may be that the workload metric is less than the threshold or less than or equal to the threshold condition.

Upon determining that the workload metric satisfies the threshold condition in block 84, some embodiments may proceed to automatically provision an instance of the single-tenant application, as indicated in block 86. As described below, provisioning may include adding a new instance of the application on the computing device executing other instances (such as all other instances) or creating another instance in another container, another virtual machine, or another computing device.

In some embodiments, adding another instance includes starting executing another instance of the single-tenant application in the same computing device as other instances of the single-tenant application, such as all other instances of the single-tenant application, or a subset of the other instances of the single-tenant application. In some embodiments, the added instance of the single-tenant application may be added in the same computing device as is executing some or all of the process 80.

In some embodiments, adding an instance of the single-tenant application in the same computing device as others may include accessing a listing of previously configured copies of runtime environments of the single-tenant application preformed, at least partially, on that computing device. For example, some embodiments may replicate the runtime environment of the single-tenant application in multiple subdirectories, with each subdirectory corresponding to a different instance when executed. In some embodiments, each of the subdirectories may include different respective copies of resources by used by the different instances of the single-tenant application when running, including directory trees, configuration files, images, audio files, process logs, libraries, frameworks, and various other dependencies. In some embodiments, a new copy of such a subdirectory may be dynamically added, for example, in response to determining that all subdirectories are currently used by an instance of the single-tenant application. Some embodiments may copy a template subdirectory to form a new subdirectory for the instance to be added and update a listing of copies of runtime environments to add the added copy.

In some cases, some of these copies of the runtime environment of the single-tenant application may be dormant, corresponding to copies having an executable file that is not currently running. In some embodiments, program state may maintain a listing of these copies, the file path of the copies (or network address and file path where the copies span computers), and a flag indicating whether the copy is currently being executed as an instance of the single-tenant application or the respective copy of the single-tenant application runtime environment is dormant. Some embodiments may iterate through this list to identify a dormant copy and information to access the dormant copy, for instance, a path of a subdirectory in which that copy resides.

Some embodiments may execute a system call to launch an executable file in that subdirectory to launch the added instance of the single-tenant application at the file path. Or some embodiments may send a command to another computing device to execute such a system call. In some embodiments, each of a plurality of the instances executing on the same computing device may execute in a single instance of an operating-system user-space, for example, with the same file system and memory address space of the operating system.

Some embodiments may provision the added instance of the single-tenant application in a new container, such as an instance-specific container. In some embodiments, adding a container may include sending a command to a container manager, such as a service configured to orchestrate containers, instructing the container manager to provision a new container. Some embodiments may instruct the container manager to retrieve a container image and execute the container image in a new instance of a container. In this example, some instances of the single tenant application may execute in different user space instances of the same computing device or on different computing devices.

In some embodiments, different instances of the single-tenant application may be added in different virtual machines executing on one or more computing devices. Some embodiments may cause a virtual machine image to be copied to a computing device and executed. In some embodiments, the virtual machine image (or the above describe container images) may include the runtime environment of the single-tenant applications, including dependencies thereof and a preconfigured directory structure. In some embodiments, each of the virtual machines may execute one or more instances of the single-tenant application in different operating systems.

In some embodiments, provisioning the added instance of the single-tenant application may include causing an added instance to be executed on a different computing device from other computing devices executing other instances of the single-tenant application. In some embodiments, this may include making an application program interface call to a provider of a public or private cloud datacenter requesting a new computing device and then causing a machine image to be installed on the computing device and executed. In some cases, in these machine images, the operating system may be preconfigured to execute the instance of the single-tenant application automatically upon booting. Or some embodiments may include a local agent that manages instances of the single tenant application, for instance, scaling instances on that device responsive to commands from a computing device executing the process 80.

In some embodiments, the added instances of the single-tenant application may be configured for the environment in which the added instance is executed. In some embodiments, the subdirectory or directory with the runtime environment of the added instance of the single-tenant application may include a configuration file, such as a text file in a human readable hierarchical serialization format, like example, JSON, YAML, or XML. Some embodiments may parse that text file and edit entries in the text file to configure the instance of the single-tenant application. In some embodiments, configuration may be performed before adding the instance of the single-tenant application.

In some embodiments, configuration includes specifying a network socket to be monitored by the added instance of the single-tenant application in the configuration file for communication with other components of the computing environment 10 described above. In some embodiments, this may include specifying an IP address, a port number, or both. Some embodiments may maintain in memory a listing of candidate port numbers and entries indicating whether those candidate port numbers are currently assigned to an instance of the single-tenant application. Some embodiments may iterate through this list to identify an unassigned port number and assign that port number in the listing and in the configuration file for the added instance of the single-tenant application. In some embodiments, configuration may be performed on machine images for containers, virtual machines, or devices, before the machine images are provisioned in the respective container, virtual machine, or computing device in which the machine images run.

In some embodiments, configuration may also include updating the above-described tenant mapping repository to associate the added instance with the network socket monitored by the added instance, such that the reverse proxy may retrieve the appropriate network address and port number to communicate with the added instance upon the added instance being assigned to a session with a tenant user account.

In some embodiments, the instance of the single-tenant application may be added before receiving the request to initiate a new session in block 82, for example, upon determining that a number of unused instances (e.g., providing a buffer of instances to respond to sudden spikes in requested sessions) is less than a threshold, such as less than two unused instances. In other cases, instances may be added in response to receiving the request in block 82, for example, to add an instance upon determining that there are no unused instances available. Or instances may be always added in response to a new request, and unused instances may be automatically terminated consistent with the illustrated process 80. In some embodiments, adding instances within the same computing device other instances may be faster than adding instances by instantiating new containers, virtual machines or computing devices, and different approaches may be used depending upon which technique is selected for adding new instances.

In some embodiments, multiple instances may be added within the same computing device, and the threshold may be adjusted based on whether the resources of the computing device support additional added instances. Upon reaching the limits of available resources, e.g., upon the number of instances executing on the single computing device approaching the threshold at which to add new instances would require another computing device, some embodiments may predictively automatically add an instance on a different computing device in view of the added latency associated with spinning up a new computing device. Or a similar approach may be used when adding an instance will require adding another virtual machine with an instance of the single-tenant application.

After provisioning the added instance, some embodiments may return to the determination of block 84. In some cases, the added instance may cause the determination of whether the threshold condition is satisfied of block 84 to change, in which case the process may proceed to block 88. Or in some cases, even with the added instance, the workload metric may still satisfy the threshold condition of block 84, and another instance may be provisioned in block 86.

Upon a determination that the workload metric does not satisfy the threshold condition of block 84, some embodiments may identify unused instances of the single-tenant application in block 88. In some cases, this may include accessing the listing of instances to identify instances having a flag value set indicating that the instances are used or not used. Some embodiments may select among the unused instances to identify the unused instances of block 88. Or in some embodiments, this operation may include launching a new instance in all cases (e.g., instances of the single-tenant application may not be reused at different times by different tenants).

Next, some embodiments may proceed to assign the new session for the request in block 82 to the identified unused instance of the single-tenant application, as indicated in block 90. In some cases, identification may occur before receiving a request in block 82 or after, e.g., in response to receiving the request. In some cases, assigning the new instance may include updating the listing of instances of the single-tenant application to change a flag of the assigned instance to indicate that the assigned instance has been assigned. Further, some embodiments may include updating the above-describe mappings between the assigned instance and the session with the single-tenant application and the tenant user account. In some cases, these mappings may be used in the process of FIG. 2 as described above to translate requests and route network communications to the appropriate single-tenant application instance for the tenant user account.

Figure 3:
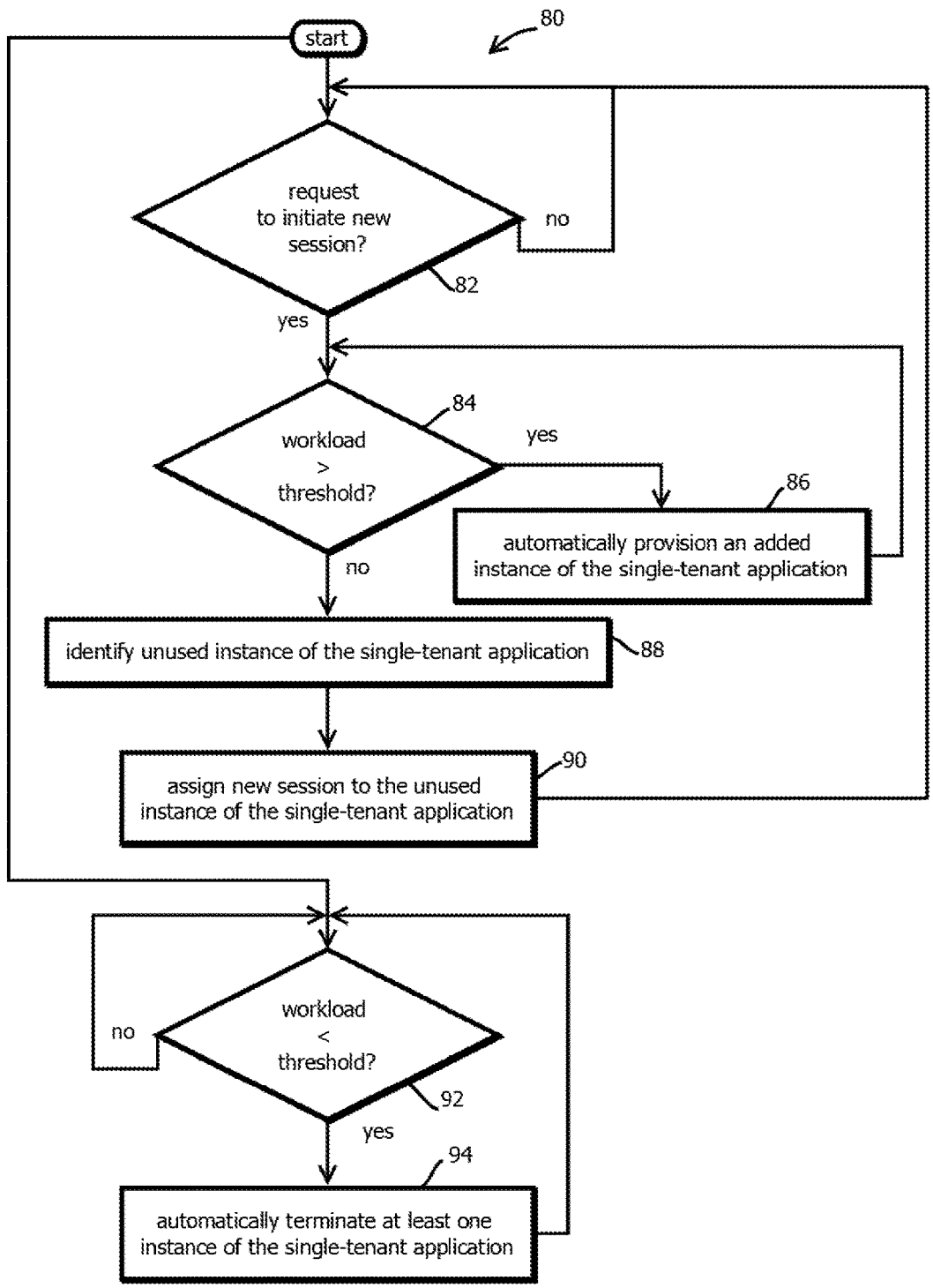
FIG. 3 shows an example of a process to dynamically scale a number of instances of a single-tenant application in accordance with some embodiments.

As illustrated in FIG. 3, some embodiments may execute a process that (e.g., concurrently with the above operations) monitors whether instances of the single-tenant application are being used and, in some cases, terminates some unused instances. In some cases, termination is performed responsive to a determination in block 92 of whether a workload metric (e.g., the same or different from that described above) satisfies a threshold condition.

The threshold of block 92 may take a variety of different forms, depending upon the desired functionality and the type of metric used for the workload. For example, in some embodiments, the threshold is a number of unused instances of the single-tenant application. In another example, the threshold is a percentage of instances of the single-tenant application that are presently unused.

In some embodiments, the threshold of block 92 is a threshold value that is smaller than or otherwise differently from the threshold of block 84. For example, the threshold of block 84 may cause an instance to be provisioned upon a determination that there are fewer than two remaining unused instances of a single-tenant application instance. In contrast, the threshold of block 92 may cause an instance of the single-tenant application to be terminated in response to a determination that there are more than four unused instances of the single-tenant application. In some embodiments, the determination of block 92 is a determination of whether the workload metric satisfies a threshold condition, such as a threshold condition that the workload metric is less than a threshold value, less than or equal to a threshold value, or in cases where the workload metric value is inverted, the determination may be one that the workload metric is greater than the threshold value or greater than or equal to the threshold value.

Upon determining that the workload does not satisfy the threshold conditional block 92, some embodiments may repeat and continue determining whether this condition has been satisfied. Alternatively, a determination that the workload is less than a threshold or otherwise satisfies the threshold conditional block 92, and some embodiments may automatically terminate at least one instance of the single-tenant application, as indicated by block 94. In some embodiments, automatic termination may include updating the listing of instances of the single-tenant application in the tenant-mapping repository 32 described above to remove the terminated instance. In some cases, removing the terminated instance may include removing more than one terminated instance, such as two or more at a time. In some cases, the workload metric may be applied on an instance-by-instance bases, and each instance determined to be unused may be terminated to prevent re-use across tenants at different times.

Some embodiments may determine which instances of the single-tenant application are currently unused with a variety of techniques. For example, some embodiments may interrogate a log file of each of the different instances of the single-tenant application, for example periodically, like once every minute, to determine whether the log file indicates ongoing usage of the single-tenant application instance. In some embodiments, the instances of the single-tenant application may be executed in different directories or in different virtual machines or different containers or different computing devices, and each instance of a single-tenant application may have its own file system or instance-specific subdirectory. The log files for each instance may be written in these respective locations, and some embodiments may retrieve those log files, parse the log file to identify a most recent transaction, such as a most recent transaction of a particular type indicating a user interaction. Some embodiments may then determine whether a timestamp associated with that log file entry is older than a threshold age, such as older than two minutes, older than 20 minutes, or older than one hour. Some embodiments may then determine, responsive to the last transaction being older than a threshold age, that the respective instance of the single-tenant application is unused. Some embodiments may update the of above-described listing of instances of the single-tenant application in the tenant-mapping repository 32 to designate the corresponding instances as unused. Or some embodiments may use the other approaches for determining use-state of instances described above.

In some embodiments, automatically terminating instances may include instructing an operating system in which the instance is executing to cease executing one or more processes of the instance. In some cases, terminating an instance may include deleting a runtime environment of the instance to prevent information leakage across sessions, or some embodiments may reuse the same runtime environment. Some embodiments may update the above-described listing of runtime environments to indicate that one has been deleted or moved to dormant status.

Thus, some embodiments may dynamically provision and terminate instances of the single-tenant application based on workload.

Figure 4:
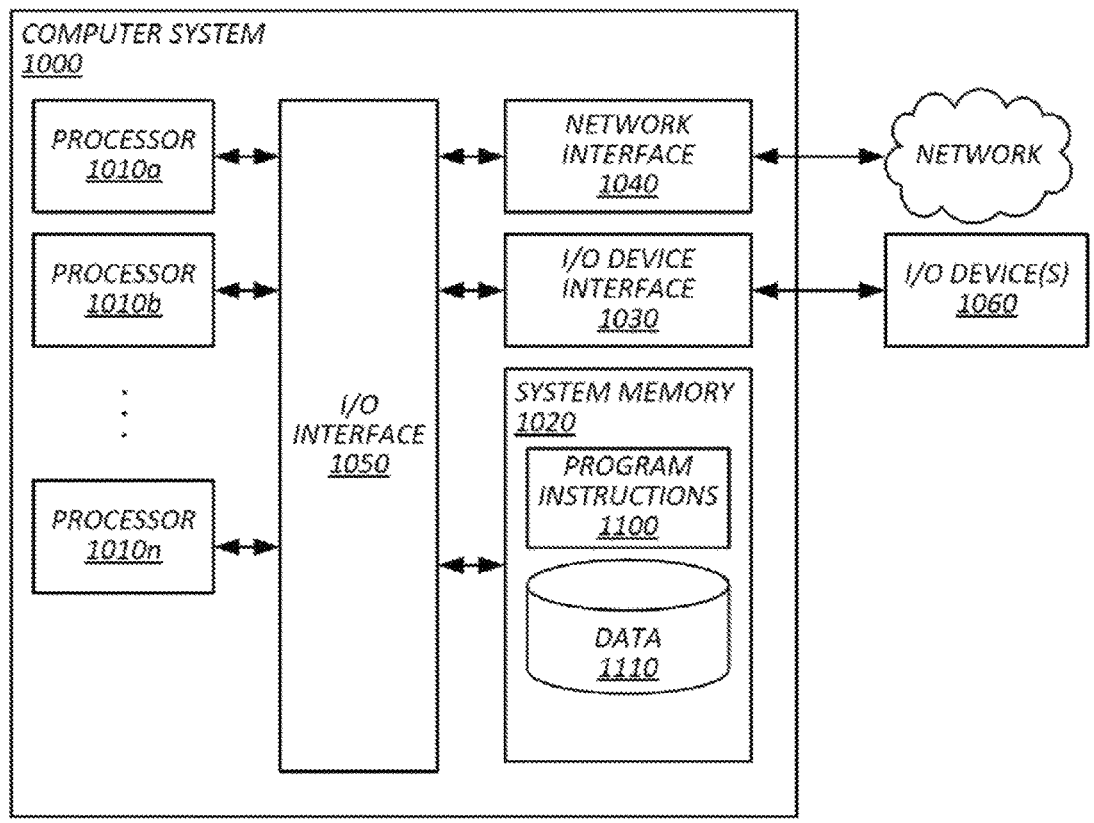
FIG. 4 shows an example of a computing device by which the above techniques may be implemented.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A tangible, non-transitory, machine-readable medium storing instructions that when executed by one or more processors effectuate operations to dynamically provision and terminate instances of a single-tenant application deployed for a multi-tenant use case based on workload, the operations comprising: assigning, with one or more processors, different instances of a single-tenant application among a plurality of instances of the single-tenant application to different computing sessions with different client computing devices associated with different tenant user accounts, wherein: each instance of the single-tenant application is configured, either before, upon, or after launching, to access data of the single-tenant application in a database, the database stores data of multiple tenants accessed by instances of the single-tenant application, and the stored data of different tenants among the multiple tenants is associated with different tenant user accounts; while the plurality of instances of the single-tenant application are executing, determining, with one or more processors, in a first determination, that a workload of the plurality of instances of the single-tenant application satisfies a first threshold condition; in response to the first determination, automatically provisioning, with one or more processors, an added instance of the single-tenant application; assigning, with one or more processors, the added instance of the single-tenant application to a session with a given client computing device; after provisioning the added instance of the single-tenant application, determining, with one or more processors, in a second determination, that a workload of the single-tenant application satisfies a second threshold condition, the second threshold condition corresponding to a smaller workload than the first threshold condition; and in response to the second determination, automatically terminating, with one or more processors, at least one instance of the single-tenant application, wherein: each instance of the single-tenant application is accessed by a single tenant at a time, and a number of instances of the single-tenant application executing is dynamically scaled responsive to workload.

2. The medium of embodiment 1, wherein: the single-tenant application is configured to not distinguish among the multiple tenants in access requests to the database; and the operations comprise editing queries from instances of the single-tenant application to the database to add a query predicate that specifies the queries do not apply to data of tenants in the database other than a tenant identified by the query predicate.

3. The medium of any one of embodiments 1-2, wherein: the first determination is made responsive to a request from the given client computing device to access the single-tenant application.

4. The medium of any one of embodiments 1-3, wherein: the first determination is made before receiving a request from the given client computing device to initiate a session with the single-tenant application; and the session with the given client computing device is the first session with a client computing device of the added instance of the single-tenant application.

5. The medium of any one of embodiments 1-4, wherein the operations comprise: receiving a database access request from the added instance of the single-tenant application to the database to access data of a tenant having a tenant user account, wherein the given computing device is logged into the tenant user account; modifying the received database access request to add a reference to a field of the database having values that distinguish data of different tenants among the multiple tenants from data of other tenants among the multiple tenants; and sending the modified database access request to the database.

6. The medium of embodiment 5, wherein: the database is a noSQL (no structured query language) document database having a plurality of documents identified in at least one index of contents of the documents; the at least one index has an alias with a filter configured to segment the at least one index according to tenant identifier; and modifying the received database access request comprises specifying a tenant identifier to be applied by the filter of the alias.

7. The medium of any one of embodiments 1-6, wherein: the added instance of the single-tenant application is executed in a user-space instance of an operating system along with another instance of the single-tenant application on a computing device; the added instance of the single-tenant application is configured to monitor a first port number of a network interface of the computing device; the other instance of the single-tenant application is configured to monitor a second port number of the network interface of the computing device, the second port number being different from the first port number; the added instance of the single-tenant application and the other instance of the single-tenant application monitor different respective network sockets with the same network address and different port numbers.

8. The medium of any one of embodiments 1-7, wherein: the added instance of the single-tenant application is executed in a different container, virtual machine, or computing device from at least some of the other instances of the single-tenant application; and a reverse proxy server routes messages between each of the instances of the single-tenant applications and client computing devices.

9. The medium of any one of embodiments 1-8, wherein: the plurality of instances of the single-tenant application are part of a hybrid single-tenant/multi-tenant application in which a multi-tenant application writes data to the database and the data is viewed or otherwise accessed by tenant users via the single-tenant application.

10. The medium of embodiment 9, wherein: the multi-tenant application comprises a monitoring application configured to monitor delivery of a plurality of applications provided by respective ones of the multiple tenants.

11. The medium of any one of embodiments 1-10, wherein: different tenants access the same instance of the single-tenant application at different times but not concurrently.

12. The medium of any one of embodiments 1-11, wherein the operations comprise: executing a process that monitors a log file of each instance of the single-tenant application, wherein determining that the workload of the single-tenant application satisfies the second threshold condition comprises determining that a timestamp of a most recent transaction in the log file of at least one instance of the single-tenant application is older than a threshold age.

13. The medium of any one of embodiments 1-12, wherein: provisioning the added instance of the single-tenant application comprises adding a service corresponding to the single-tenant application to a computing device executing a plurality of services corresponding to other instances of the single-tenant application, wherein at least some of the services have a plurality of processes.

14. The medium of any one of embodiments 1-13, wherein: the added instance of the single-tenant application executes on a single computing device along with the plurality of instances of the single-tenant application; provisioning the added instance of the single-tenant application comprises: identifying a port number of the computing device that is not assigned to another instance of the single-tenant application; and configuring the added instance of the single-tenant application to monitor the added port number by writing the port number to a human readable hierarchical serialization data format document storing configuration settings of the added instance.

15. The medium of embodiment 14, wherein: provisioning, the first determination, the second determination, and terminating are performed by a service executing on a computing device that executes the plurality of instances of the single-tenant application and the added instance of the single-tenant application.

16. A method comprising: the operations of any one of embodiments 1-15.

17. A system, comprising: one or more processors; and memory storing instructions that when executed by the processors cause the processors to effectuate operations comprising: the operations of any one of embodiments 1-15.

What is claimed is:

1. A tangible, non-transitory, machine-readable medium storing instructions that when executed by one or more processors effectuate operations to dynamically provision and terminate instances of a single-tenant application deployed for a multi-tenant use case based on workload, the operations comprising:

assigning, with one or more processors, different instances of a single-tenant application among a plurality of instances of the single-tenant application to different computing sessions with different client computing devices associated with different tenant user accounts, wherein:
 each instance of the single-tenant application is configured, either before, upon, or after launching, to access data of the single-tenant application in a database,
 the database stores data of multiple tenants accessed by instances of the single-tenant application, and
 the stored data of different tenants among the multiple tenants is associated with different tenant user accounts;

while the plurality of instances of the single-tenant application are executing, determining, with one or more processors, in a first determination, that a workload of the plurality of instances of the single-tenant application satisfies a first threshold condition;

in response to the first determination, automatically provisioning, with one or more processors, an added instance of the single-tenant application;

assigning, with one or more processors, the added instance of the single-tenant application to a session with a given client computing device;

receiving, with one or more processors, a database access request from the added instance of the single-tenant application to the database to access data of a tenant having a tenant user account, wherein the given computing device is logged into the tenant user account;

modifying, with one or more processors, the received database access request to add a reference to a field of the database having values that distinguish data of different tenants among the multiple tenants from data of other tenants among the multiple tenants;

sending, with one or more processors, the modified database access request to the database;

after provisioning the added instance of the single-tenant application, determining, with one or more processors, in a second determination, that a workload of the single-tenant application satisfies a second threshold condition, the second threshold condition corresponding to a smaller workload than the first threshold condition; and in response to the second determination, automatically terminating, with one or more processors, at least one instance of the single-tenant application, wherein:

each instance of the single-tenant application is accessed by a single tenant at a time, and a number of instances of the single-tenant application executing is dynamically scaled responsive to workload.

2. The medium of claim 1, wherein:
the single-tenant application is configured to not distinguish among the multiple tenants in access requests to the database; and
the operations comprise editing queries from instances of the single-tenant application to the database to add a query predicate that specifies the queries do not apply to data of tenants in the database other than a tenant identified by the query predicate.

3. The medium of claim 1, wherein:
the first determination is made responsive to a request from the given client computing device to access the single-tenant application.

4. The medium of claim 1, wherein:
the first determination is made before receiving a request from the given client computing device to initiate a session with the single-tenant application; and
the session with the given client computing device is the first session with a client computing device of the added instance of the single-tenant application.

5. The medium of claim 1, wherein:
the database is a noSQL (no structured query language) document database having a plurality of documents identified in at least one index of contents of the documents;
the at least one index has an alias with a filter configured to segment the at least one index according to tenant identifier; and
modifying the received database access request comprises specifying a tenant identifier to be applied by the filter of the alias.

6. The medium of claim 1, wherein:
the added instance of the single-tenant application is executed in a different container, virtual machine, or computing device from at least some of the other instances of the single-tenant application; and
a reverse proxy server routes messages between each of the instances of the single-tenant applications and client computing devices.

7. The medium of claim 1, wherein:
the plurality of instances of the single-tenant application are part of a hybrid single-tenant/multi-tenant application in which a multi-tenant application writes data to the database and the data is viewed or otherwise accessed by tenant users via the single-tenant application.

8. The medium of claim 7, wherein:
the multi-tenant application comprises a monitoring application configured to monitor delivery of a plurality of applications provided by respective ones of the multiple tenants.

9. The medium of claim 1, wherein:
different tenants access the same instance of the single-tenant application at different times but not concurrently.

10. The medium of claim 1, wherein the operations comprise:
executing a process that monitors a log file of each instance of the single-tenant application, wherein determining that the workload of the single-tenant application satisfies the second threshold condition comprises determining that a timestamp of a most recent transaction in the log file of at least one instance of the single-tenant application is older than a threshold age.

11. The medium of claim 1, wherein:
provisioning the added instance of the single-tenant application comprises adding a service corresponding to the single-tenant application to a computing device executing a plurality of services corresponding to other instances of the single-tenant application, wherein at least some of the services have a plurality of processes.

12. The medium of claim 1, wherein:
the added instance of the single-tenant application executes on a single computing device along with the plurality of instances of the single-tenant application;
provisioning the added instance of the single-tenant application comprises:
identifying a port number of the computing device that is not assigned to another instance of the single-tenant application; and
configuring the added instance of the single-tenant application to monitor the added port number by writing the port number to a human readable hierarchical serialization data format document storing configuration settings of the added instance.

13. The medium of claim 12, wherein:
provisioning, the first determination, the second determination, and terminating are performed by a service executing on a computing device that executes the plurality of instances of the single-tenant application and the added instance of the single-tenant application.

14. The medium of claim 1, wherein provisioning, terminating, or both comprise:
steps for dynamically scaling a number of instances of a single-tenant application based on workload.

15. A method, comprising:
assigning, with one or more processors, different instances of a single-tenant application among a plurality of instances of the single-tenant application to different computing sessions with different client computing devices associated with different tenant user accounts, wherein:
each instance of the single-tenant application is configured, either before, upon, or after launching, to access data of the single-tenant application in a database,
the database stores data of multiple tenants accessed by instances of the single-tenant application, and
the stored data of different tenants among the multiple tenants is associated with different tenant user accounts;
while the plurality of instances of the single-tenant application are executing, determining, with one or more processors that a workload of the plurality of instances of the single-tenant application satisfies a first threshold condition;
in response to the determination, automatically provisioning, with one or more processors, an added instance of the single-tenant application; and assigning, with one or more processors, the added instance of the single-tenant application to a session with a given client computing device, wherein:
- the added instance of the single-tenant application is executed in a user-space instance of an operating system along with another instance of the single-tenant application on a computing device;
- the added instance of the single-tenant application is configured to monitor a first port number of a network interface of the computing device;
- the other instance of the single-tenant application is configured to monitor a second port number of the network interface of the computing device, the second port number being different from the first port number;
- the added instance of the single-tenant application and the other instance of the single-tenant application monitor different respective network sockets with the same network address and different port numbers.

16. The method of claim 15, wherein:
a reverse proxy server routes messages between each of the instances of the single-tenant applications and client computing devices.

17. The method of claim 15, wherein:
the plurality of instances of the single-tenant application are part of a hybrid single-tenant/multi-tenant application in which a multi-tenant application writes data to the database and the data is viewed or otherwise accessed by tenant users via the single-tenant application.

18. The method of claim 15, wherein:
provisioning the added instance of the single-tenant application comprises adding a service corresponding to the single-tenant application to a computing device executing a plurality of services corresponding to other instances of the single-tenant application, wherein at least some of the services have a plurality of processes.

19. The method of claim 18, wherein:
the multi-tenant application comprises a monitoring application configured to monitor delivery of a plurality of applications provided by respective ones of the multiple tenants.

20. A tangible, non-transitory, machine-readable medium storing instructions that when executed by one or more processors effectuate operations comprising:
assigning, with one or more processors, different instances of a single-tenant application among a plurality of instances of the single-tenant application to different computing sessions with different client computing devices associated with different tenant user accounts, wherein:
- each instance of the single-tenant application is configured, either before, upon, or after launching, to access data of the single-tenant application in a database,
- the database stores data of multiple tenants accessed by instances of the single-tenant application, and
- the stored data of different tenants among the multiple tenants is associated with different tenant user accounts;

while the plurality of instances of the single-tenant application are executing, determining, with one or more processors that a workload of the plurality of instances of the single-tenant application satisfies a first threshold condition;
in response to the determination, automatically provisioning, with one or more processors, an added instance of the single-tenant application; and
assigning, with one or more processors, the added instance of the single-tenant application to a session with a given client computing device, wherein:
- provisioning the added instance of the single-tenant application comprises adding a service corresponding to the single-tenant application to a computing device executing a plurality of services corresponding to other instances of the single-tenant application, wherein at least some of the services have a plurality of processes.

* * * * *